(12) United States Patent
Thangaraj et al.

(10) Patent No.: US 9,185,407 B2
(45) Date of Patent: *Nov. 10, 2015

(54) DISPLAYING AUDIO DATA AND VIDEO DATA

(71) Applicant: Broadcom Corporation, Irvine, CA (US)

(72) Inventors: Arul Thangaraj, Bangalore (IN); Sandeep Bhatia, Bangalore (IN); Xuemen Chen, Rancho Santa Fe, CA (US)

(73) Assignee: BROADCOMM CORPORATION, Irvine, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 13/709,309

(22) Filed: Dec. 10, 2012

(65) Prior Publication Data

US 2013/0101050 A1    Apr. 25, 2013

Related U.S. Application Data

(63) Continuation of application No. 11/017,000, filed on Dec. 20, 2004, now Pat. No. 8,331,456, which is a continuation-in-part of application No. 10/259,032, filed on Sep. 27, 2002, now Pat. No. 7,953,194.

(51) Int. Cl.
*H04N 7/12* (2006.01)
*H04N 19/44* (2014.01)
(Continued)

(52) U.S. Cl.
CPC .......... *H04N 19/00533* (2013.01); *G11B 27/10* (2013.01); *H04N 7/56* (2013.01); *H04N 19/44* (2014.11); *H04N 21/2368* (2013.01); *H04N 21/4341* (2013.01)

(58) Field of Classification Search
CPC . H04N 7/50; H04N 19/00533; H04N 5/0736; H04N 19/44; H04N 21/2368; H04N 21/4341; H04N 7/56; G11B 27/10
USPC ....................................... 375/240.25
See application file for complete search history.

(56) References Cited

U.S. PATENT DOCUMENTS 5,396,497 A * 3/1995 Veltman .................... 375/240.25
5,808,722 A * 9/1998 Suzuki ............................. 352/12

(Continued)

OTHER PUBLICATIONS

US Notice of Allowance for U.S. Appl. No. 11/017,000 dated Aug. 8, 2012.

(Continued)

*Primary Examiner* — Jessica M Prince
(74) *Attorney, Agent, or Firm* — Foley & Lardner LLP; Christopher J. McKenna; Daniel E. Rose

(57) ABSTRACT

Presented herein are a system, method, and apparatus for audio and video synchronization. In one embodiment, there is presented a method for displaying audio data and video data. The method comprises examining a plurality of portions of the audio data, where each of said plurality of portions of audio data is associated with a time stamp; examining a plurality of portions of the video data, where each of said plurality of portions of the video data is associated with a time stamp; decoding one of the portions of the video data; and decoding one of the portions of the audio data while decoding the one of the portions of the video data. The difference between the time stamp associated with the one of the portions of the video data and the time stamp associated with the one of the portions of the audio data is within a certain margin of error from a predetermined offset.

16 Claims, 5 Drawing Sheets

Video Data 10

| 15V(0) | 10V(0) | 15V(1) | 10V(1) | 15V(2) | 10V(2) |

Audio Data 10

| 15A(0) | 10A(0) | 15A(1) | 10A(1) | 15A(2) | 10A(2) |

(51) Int. Cl.
  *G11B 27/10* (2006.01)
  *H04N 7/56* (2006.01)
  *H04N 21/2368* (2011.01)
  *H04N 21/434* (2011.01)

(56) References Cited

U.S. PATENT DOCUMENTS

| | | | |
|---|---|---|---|
| 5,828,414 A | 10/1998 | Perkins et al. | |
| 5,905,845 A * | 5/1999 | Okada et al. | 386/244 |
| 6,262,776 B1 * | 7/2001 | Griffits | 348/512 |
| 6,510,279 B1 * | 1/2003 | Morishita | 386/203 |
| 6,556,250 B1 | 4/2003 | Zeidler et al. | |
| 6,611,624 B1 | 8/2003 | Zhang et al. | |
| 6,710,814 B1 | 3/2004 | Ueno et al. | |
| 6,754,280 B2 | 6/2004 | Nguyen | |
| 6,798,420 B1 | 9/2004 | Xie | |
| 6,801,544 B1 | 10/2004 | Rijckaert et al. | |
| 6,853,385 B1 | 2/2005 | MacInnis et al. | |
| 6,937,988 B1 | 8/2005 | Hemkumar et al. | |
| 6,975,324 B1 | 12/2005 | Valmiki et al. | |
| 7,123,307 B1 | 10/2006 | Altmann | |
| 7,268,826 B2 * | 9/2007 | Lundblad et al. | 348/515 |
| 7,486,874 B2 | 2/2009 | Yamauchi | |
| 7,953,194 B2 | 5/2011 | Chen et al. | |
| 2002/0063796 A1 | 5/2002 | Min | |
| 2002/0087999 A1 | 7/2002 | Kashima | |
| 2002/0100064 A1 | 7/2002 | Ward et al. | |
| 2003/0002587 A1 | 1/2003 | Nguyen | |
| 2003/0066094 A1 | 4/2003 | Schaar et al. | |
| 2003/0097663 A1 | 5/2003 | Puputti | |
| 2003/0103766 A1 * | 6/2003 | Sugahara et al. | 386/96 |
| 2003/0142752 A1 | 7/2003 | Demas et al. | |
| 2003/0165196 A1 | 9/2003 | Demas et al. | |
| 2004/0041946 A1 * | 3/2004 | Gries et al. | 348/515 |
| 2004/0073949 A1 | 4/2004 | Chen et al. | |
| 2006/0034337 A1 | 2/2006 | Ryu et al. | |
| 2006/0098742 A1 * | 5/2006 | Meenakshisundaram et al. | 375/240.27 |
| 2006/0098936 A1 * | 5/2006 | Ikeda et al. | 386/46 |

OTHER PUBLICATIONS

US Notice of Allowance for U.S. Appl. No. 13/105,311 dated May 12, 2014.
US Office Action for U.S. Appl. No. 11/017,000 dated Jan. 4, 2011.
US Office Action for U.S. Appl. No. 11/017,000 dated Jan. 5, 2012.
US Office Action for U.S. Appl. No. 11/017,000 dated Aug. 19, 2008.
US Office Action for U.S. Appl. No. 11/017,000 dated Aug. 20, 2009.
US Office Action for U.S. Appl. No. 11/017,000 dated Aug. 9, 2011.
US Office Action for U.S. Appl. No. 13/105,311 dated Jan. 30, 2014.

* cited by examiner

Video Data 10

Audio Data 10

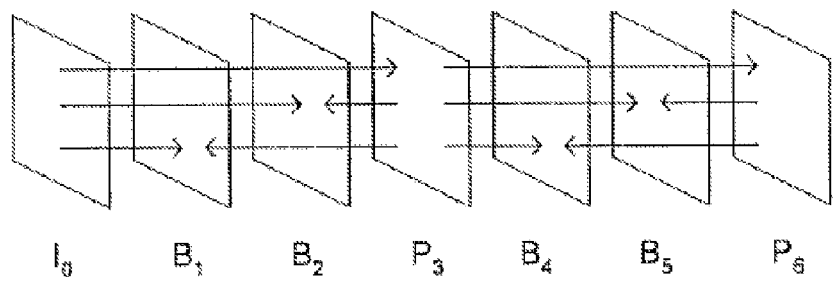
FIGURE 4B
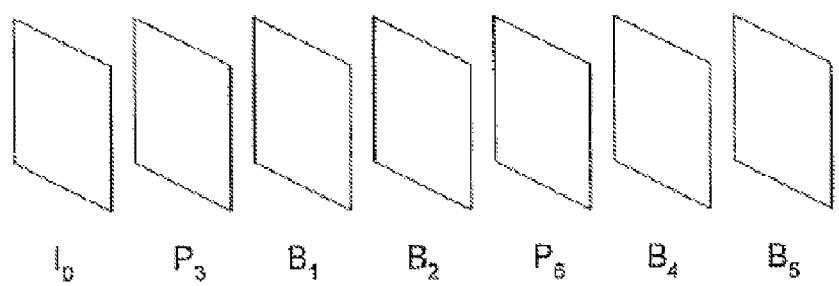
FIGURE 4C
| TS | 10A(0) | TS | 10A(1) | TS | 10A(2) |
|----|--------|----|--------|----|--------|
|    |        |    |        |    |        |
FIGURE 4D

DISPLAYING AUDIO DATA AND VIDEO DATA

RELATED APPLICATIONS

This application is a continuation of copending U.S. utility application Ser. No. 11/017,000, entitled, "System and Method for Audio and Visual Synchronization," filed Dec. 20, 2004 and issued as U.S. Pat. No. 8,331,345 on Dec. 11, 2012, which is a continuation-in-part of U.S. utility application Ser. No. 10/259,032, entitled "Handling Video Transition Errors in Video on Demand Systems," filed Sep. 27, 2002 and issued as U.S. Pat. No. 7,953,194 on May 31, 2011, each of which are each entirely incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Common audio and video encoding standards, such as MPEG-1, Layer 3 (audio) and MPEG-2, or H.264 (video), significantly compress audio and video data, respectively. This allows for the transmission and storage of the audio and video data with less bandwidth and memory.

In general, the video encoding standards operate on the pictures forming the video. A video comprises a series of pictures that are captured at time intervals. When the pictures are displayed at corresponding time intervals in the order of capture, the pictures simulate motion.

Generally, audio signals are captured in frames representing particular times. During playback, the frames are played at corresponding time intervals in the order of capture. In multi-media applications, it is desirable to play the audio and video, such that audio frames and pictures that were captured during the same time interval are played at approximately the same time interval.

Encoding standards use time stamps to facilitate playback of audio and video at appropriate times. A decoder compares the times stamps to a system clock to determine the appropriate portions of the audio and video to play. The time stamps are generally examined prior to decoding, because decoding consumes considerable processing power.

In many decoders, there are separate audio and video decoding portions. The audio and video decoding portions take different amounts of time to decode the audio and video data. Generally, the video decoding portion takes longer time to decode the video data. Accordingly, decoding and playing audio and video data with the same time stamp can cause a time lag between the audio and video. This is undesirable to the user.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

Presented herein is a system, method, and apparatus for audio and video synchronization.

In one embodiment, there is presented a method for displaying audio data and video data. The method comprises examining a plurality of portions of the audio data, each of said plurality of portions of audio data associated with a time stamp; examining a plurality of portions of the video data, each of said plurality of portions of the video data associated with a time stamp; decoding one of the portions of the video data; decoding one of the portions of the audio data while decoding the one of the portions of the video data; and wherein the difference between the time stamp associated with the one of the portions of the video data and the time stamp associated with the one of the portions of the audio data is within a certain margin of error from a predetermined offset.

In another embodiment, there is presented a decoder system for displaying audio data and video data. The decoder system comprises one or more controllers, an audio decoder, and a video decoder. The one or more controllers examine a plurality of portions of the audio data, where each of said plurality of portions of audio data is associated with a time stamp and examines a plurality of portions of the video data, and where each of said plurality of portions of the video data is associated with a time stamp. The audio decoder decodes one of the portions of the audio data while the video decoder decodes one of the portions of the video data. The difference between the time stamp associated with the one of the portions of the video data and the time stamp associated with the one of the portions of the audio data is within a certain margin of error from a predetermined offset.

These and other advantageous and novel features as well as details of illustrated embodiments will be more fully understood from the following description and drawings.

BRIEF DESCRIPTION OF SEVERAL VIEWS OF THE DRAWINGS

FIG. 4B is a block diagram describing temporal compression in accordance with the MPEG-2 standard;

FIG. 4C is a block diagram describing an exemplary decode order;

FIG. 4D is a block diagram describing exemplary encoded audio data; and

DETAILED DESCRIPTION OF THE INVENTION

Figure 1:
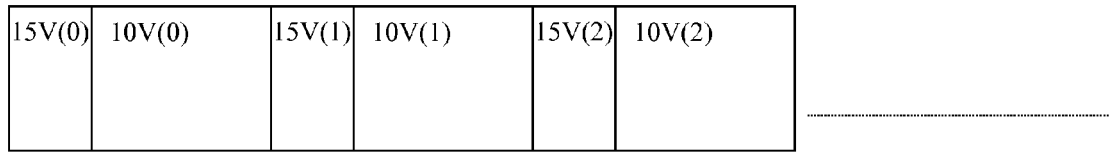
FIG. 1 is a block diagram of exemplary video and audio data.
Figure 1:
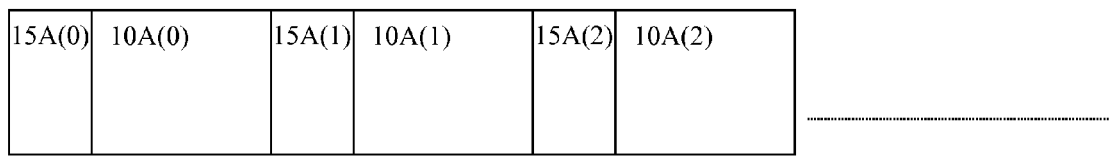

Referring now to FIG. 1, there is illustrated a block diagram describing exemplary encoded video 10V and audio data 10A. In general, the video encoding standards operate on the pictures forming the video. A video comprises a series of pictures 10V(0) ... 10V(n) that are captured at time intervals. When the pictures are displayed at corresponding time intervals in the order of capture, the pictures simulate motion.

Audio data is captured in frames 10A(0) ... 10A(n) representing particular times. During playback, the frames are played at corresponding time intervals in the order of capture.

In multi-media applications, it is desirable to play the audio and video, such that audio frames and pictures that were captured during the same time interval are played at approximately the same time interval.

Time stamps facilitate playback of audio and video at appropriate times. Portions of the video data, such as pictures 10V( ) and frames 10A( ) are associated with time stamps 15V( ), 15A( ), indicating the time that the particular picture 10V( ) or frame 10A( ) is to be displayed.

Figure 2:
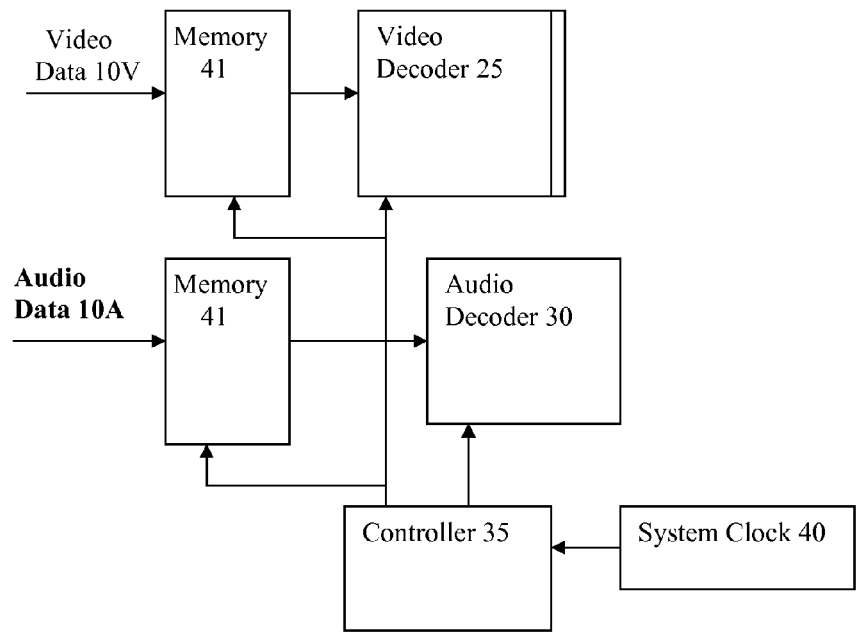
FIG. 2 is a block diagram of an exemplary decoder system for decoding video and audio data in accordance with an embodiment of the present invention.

Referring now to FIG. 2, there is illustrated a block diagram of a decoder system in accordance with an embodiment of the present invention. The decoder system 20 comprises a video decoder 25, an audio decoder 30, and a controller 35. The controller 35 examines portions of the audio data 10A( ) and video data 10V( ).

As noted above, each of the portions of audio data and video data are associated with a time stamp 15A( ), 15V( ). The video decoder 25 decodes one of the portions of the video data 10V( ) while the audio decoder 30 decodes one of the portions of the audio data 10A( ). The difference between the time stamp 15V( ) associated with the portion of the video data decoded by the video decoder 25, and the time stamp 15A( ) associated with the portions of the audio data decoded by the audio decoder 30 is within a certain margin of error from a predetermined offset.

According to certain aspects of the present invention, the predetermined offset can be based on the difference in times taken by the video decoder 25 to decode a portion of the video data 10V( ) and taken by the audio decoder 30 to decode a portion of the audio data 10A( ).

Generally, the video decoder 30 can take a longer time to decode a portion of video data. Thus, if the decoding of the portions of the audio data (i.e., are decoded later) having approximately equal time stamps 15 by an offset (the difference between decoding times of audio and video decoders), portions of the video 10V( ) and audio 10A( ) to be played at the same time become available for play at the same time. The foregoing can be achieved by decoding a video portion 10V( ) and an audio portion 10A( ) where the audio portion 10A( ) is associated with a time stamp that exceeds the time stamp associated with the video portion 10V( ) by the offset.

According to certain aspects of the invention, the decoder system can also include a system clock 40 for providing a time reference, and memory 41 for storing the audio and video data prior to decoding. The controller 35 compares the time stamps 15V( ) associated with the video data and the controller 36 compares the time stamps 15A( ) associated with the audio data to the time reference. The controller 35 then selects the portion of the video data 10V( ) associated with the time stamp 15V( ) that exceeds the time reference by within a margin of error from the offset. The controller 36 selects the portion of the audio data associated with the time stamp within the margin of error from the time reference.

Figure 3:
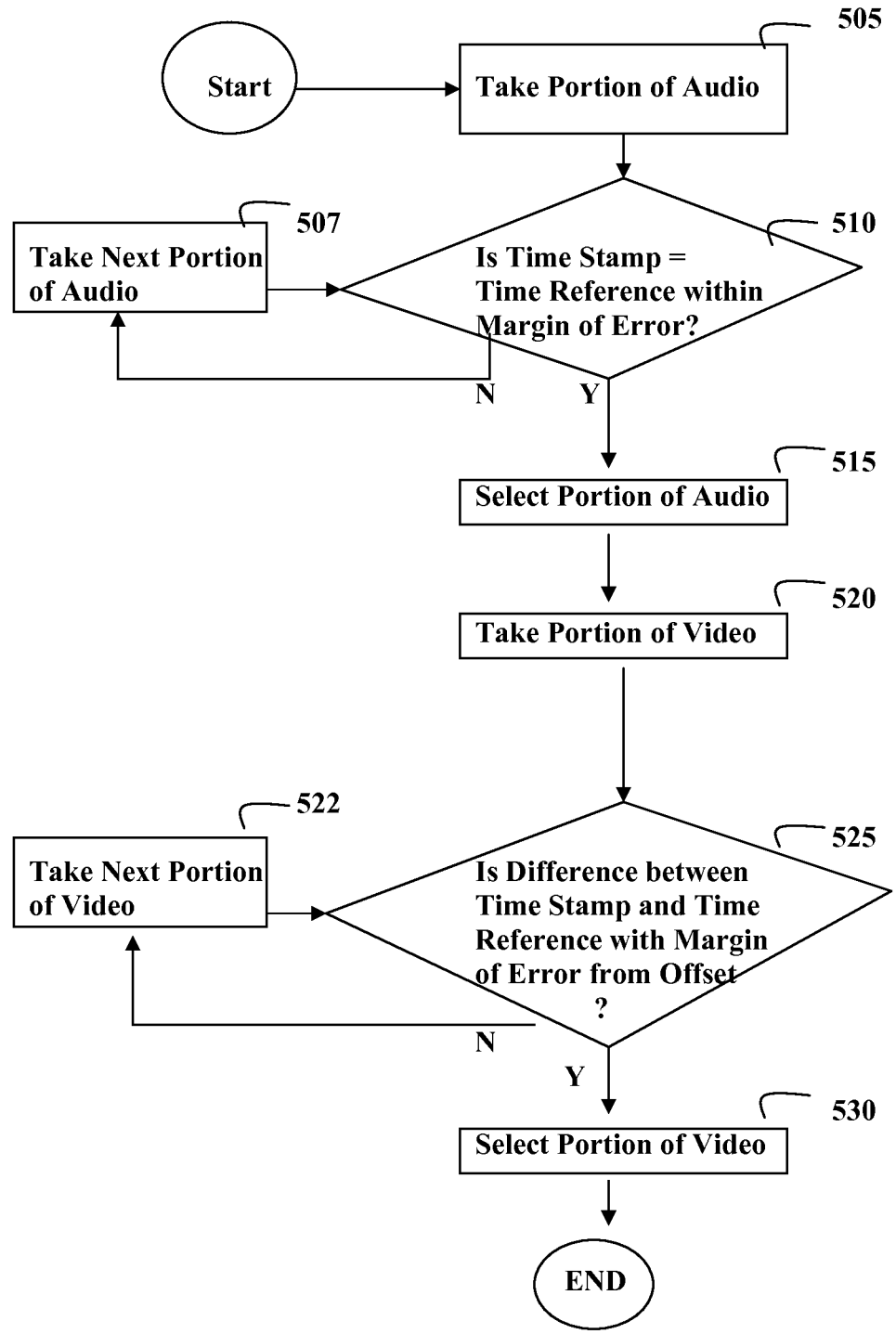
FIG. 3 is a flow diagram for decoding portions of audio and video data in accordance with an embodiment of the present invention.

Referring now to FIG. 3, there is illustrated a flow diagram for decoding portions 10V( ) of the video data and portions 10A( ) of the audio data. At 505, a portion of the audio data 10A(n) is taken. At 510, the time stamp TS for the portion 10A(n) of audio data is examined and compared to a reference time, to determine if the time stamp 15A(n) associated with the portion 10A(n) of the audio data is within a margin of error from the reference time. If the portion 10A(n) of the audio data is within the margin of error, the portion 10A(n) of the audio data is selected (515). If not, the next portion 10A(n+1) of the audio data is taken at 507, and 510-515 are repeated.

At 520, a portion 10V(n) of the video data is examined. At 525, the time stamp 15V(n) for the portion of the video data is compared to a reference time, to determine if the time stamp exceeds the reference time within a margin of error from an offset. If the time stamp 15V(n) exceeds the reference time within a margin of error from the offset, the portion 10V(n) is selected at 525. If not, the next portion 10V(n+1) is taken at 522.

At 530, the portion 10A( ) of the audio data selected during 515, and the portion 10V( ) of the video data selected during 525 are decoded together at 535. It is noted that the difference between the times stamp 15V( ) for the portion 10V( ) of the video data decoded during 535 and the time stamp 15A( ) for the portion 15A( ) of the audio data decoded during 535 are within the margin of error from the predetermined offset.

The present invention will now be described in the context of an exemplary audio encoding standard, MPEG-1, Layer 2, and video encoding standard, MPEG-2. It is understood, however, that the present invention is not limited to the foregoing standards, and can be practiced with a variety of different encoding standards.

MPEG-2 and MPEG-1, Layer 2

Figure 4A:
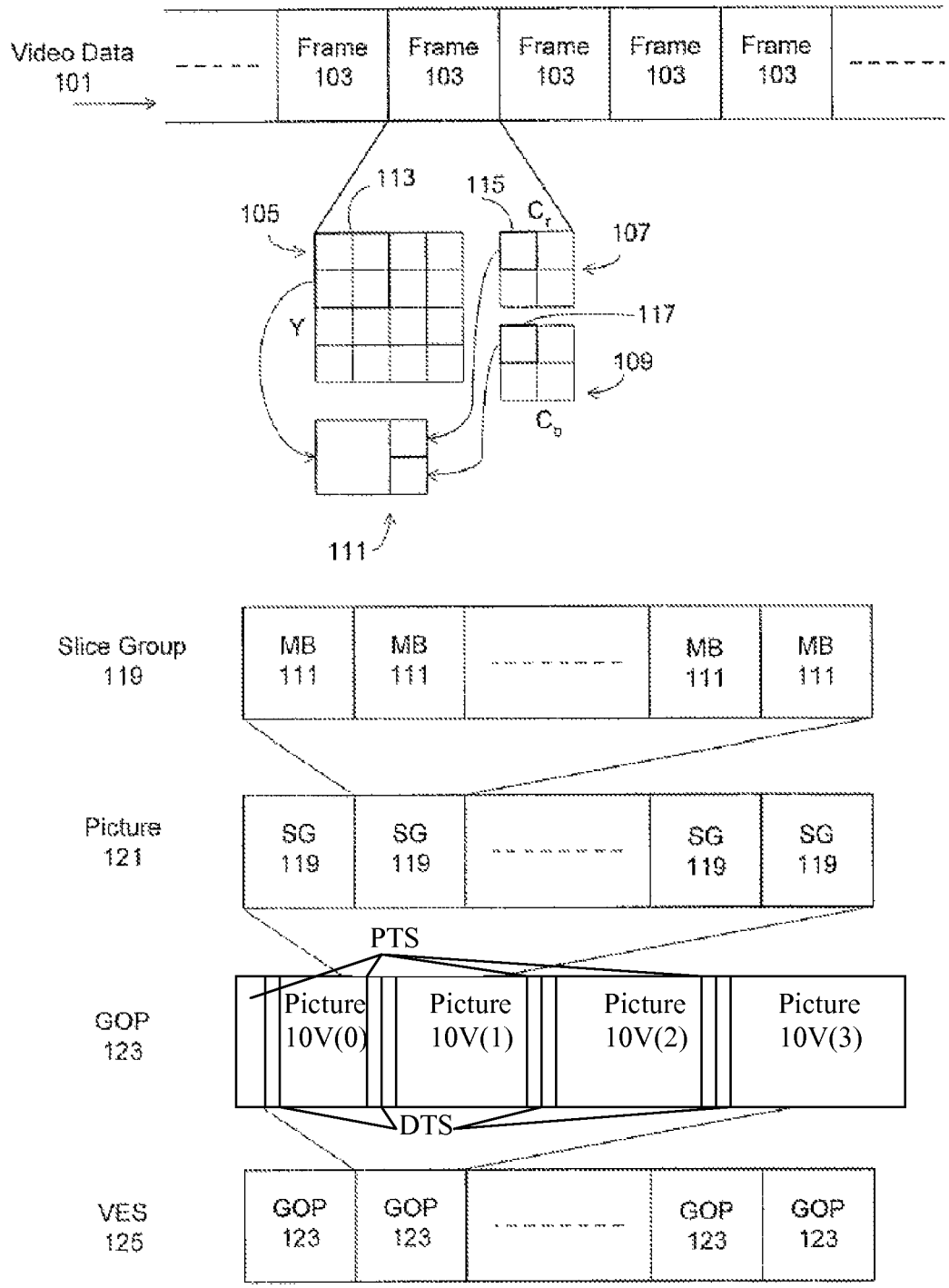
FIG. 4A is a block diagram describing encoding of video data in accordance with the MPEG-2 standard.

FIG. 4A illustrates a block diagram of an exemplary Moving Picture Experts Group (MPEG) encoding process of video data 10, in accordance with an embodiment of the present invention. The video data 10V comprises a series of pictures 10V( ) Each picture 10V( ) comprises two-dimensional grids of luminance Y, 105, chrominance red $C_r$, 107, and chrominance blue $C_b$, 109, pixels.

The two-dimensional grids are divided into 8×8 blocks, where a group of four blocks or a 16×16 block 113 of luminance pixels Y is associated with a block 115 of chrominance red $C_r$, and a block 117 of chrominance blue $C_b$ pixels. The block 113 of luminance pixels Y, along with its corresponding block 115 of chrominance red pixels $C_r$, and block 117 of chrominance blue pixels $C_b$ form a data structure known as a macroblock 111. The macroblock 111 also includes additional parameters, including motion vectors, explained hereinafter. Each macroblock 111 represents image data in a 16×16 block area of the image.

The data in the macroblocks 111 is compressed in accordance with algorithms that take advantage of temporal and spatial redundancies. For example, in a motion picture, neighboring pictures 10V( ) usually have many similarities. Motion causes an increase in the differences between pictures, the difference being between corresponding pixels of the pictures, which necessitate utilizing large values for the transformation from one picture to another. The differences between the pictures may be reduced using motion compensation, such that the transformation from picture to picture is minimized. The idea of motion compensation is based on the fact that when an object moves across a screen, the object may appear in different positions in different pictures, but the object itself does not change substantially in appearance, in the sense that the pixels comprising the object have very close values, if not the same, regardless of their position within the picture. Measuring and recording the motion as a vector can reduce the picture differences. The vector can be used during decoding to shift a macroblock 111 of one picture to the appropriate part of another picture, thus creating movement of the object. Hence, instead of encoding the new value for each pixel, a block of pixels can be grouped, and the motion vector, which determines the position of that block of pixels in another picture, is encoded.

Accordingly, most of the macroblocks 111 are compared to portions of other pictures 10V( ) (reference pictures). When an appropriate (most similar, i.e. containing the same object (s)) portion of a reference picture 10V( ) is found, the differences between the portion of the reference picture 10V( ) and the macroblock 111 are encoded. The location of the portion in the reference picture 10V( ) is recorded as a motion vector. The encoded difference and the motion vector form part of the data structure encoding the macroblock 111. In the MPEG-2 standard, the macroblocks 111 from one picture 10V( ) (a predicted picture) are limited to prediction from portions of no more than two reference pictures 10V( ). It is noted that pictures 10V( ) used as a reference picture for a predicted picture 10V( ) can be a predicted picture 10V( ) from another reference picture 10V( ).

The macroblocks 111 representing a picture are grouped into different slice groups 119. The slice group 119 includes the macroblocks 111, as well as additional parameters describing the slice group. Each of the slice groups 119 forming the picture form the data portion of a picture structure 10V( ). The picture 10V( ) includes the slice groups 119 as well as additional parameters that further define the picture 10V( ). Among the parameters are a presentation time stamp PTS, and decode time stamp DTS.

$I_0$, $B_1$, $B_2$, $P_3$, $B_4$, $B_5$, $P_6$, $B_7$, $B_8$, $P_9$, in FIG. 4B, are exemplary pictures. The arrows illustrate the temporal prediction dependence of each picture. For example, picture $B_2$ is dependent on reference pictures $I_0$, and $P_3$. Pictures coded using temporal redundancy with respect to exclusively earlier pictures of the video sequence are known as predicted pictures (or P-pictures), for example picture $P_3$ is coded using reference picture $I_0$. Pictures coded using temporal redundancy with respect to earlier and/or later pictures of the video sequence are known as bi-directional pictures (or B-pictures), for example, pictures $B_1$ is coded using pictures $I_0$ and $P_3$. Pictures not coded using temporal redundancy are known as I-pictures, for example $I_0$. In the MPEG-2 standard, I-pictures and P-pictures are also referred to as reference pictures.

The foregoing data dependency among the pictures requires decoding of certain pictures prior to others. Additionally, the use of later pictures as reference pictures for previous pictures requires that the later picture is decoded prior to the previous picture. As a result, the pictures cannot be decoded in temporal display order, i.e. the pictures may be decoded in a different order than the order in which they will be displayed on the screen. Accordingly, the pictures are transmitted in data dependent order, and the decoder reorders the pictures for presentation after decoding. $I_0$, $P_3$, $B_1$, $B_2$, $P_6$, $B_4$, $B_5$, $P_9$, $B_6$, $B_7$, in FIG. 4C, represent the pictures in data dependent and decoding order, different from the display order seen in FIG. 4B. A decoder can use the decode time stamp DTS and the presentation time stamp PTS to determine when to decode and display the pictures 10V( ).

Referring again to FIG. 4A, the pictures are then grouped together as a group of pictures (GOP) 123. The GOP 123 also includes additional parameters further describing the GOP. Groups of pictures 123 are then stored, forming what is known as a video elementary stream (VES) 125. The VES 125 is then packetized to form a packetized elementary sequence. The packetized elementary stream includes parameters, such as the decode time stamp and the presentation time stamp. The packetized elementary stream is then further packetized into fixed length packets, each of which are associated with a transport header, forming what are known as transport packets. The packetized elementary stream can also be encrypted.

The transport packets can be multiplexed with other transport packets carrying other content, such as another video elementary stream 125 or an audio elementary stream. The multiplexed transport packets form what is known as a transport stream. The transport stream is transmitted over a communication medium for decoding and displaying.

Referring now to FIG. 4D, there is illustrated a block diagram describing the encoding of an audio signal 10A. The audio signal 10A is sampled and digitized at various time intervals. The samples are divided into frames 10A( ) representing a larger time interval. Each of the frames 10A( ) are separately encoded, and transmitted to a decoder. The frames 10A( ) include a time stamp TS indicating the time that the frame 10A( ) should be played. A decoder can use the PTS to play the appropriate frames at the appropriate times.

Figure 5:
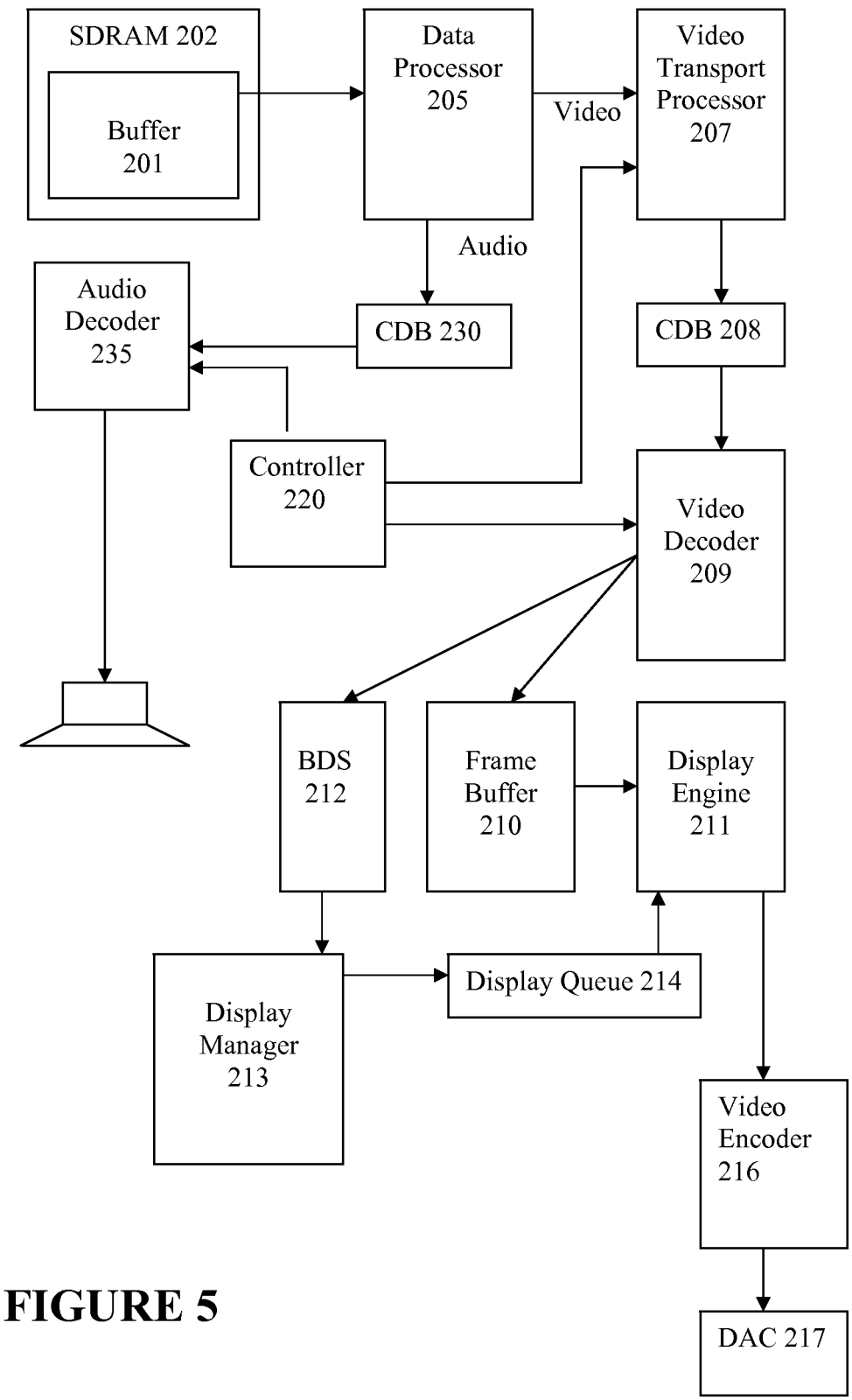
FIG. 5 is a block diagram of an exemplary decoder system in accordance with an embodiment of the present invention.

Referring now to FIG. 5, there is illustrated a block diagram of an exemplary circuit for decoding the compressed audio data 10A( ) and video data 10V( ) in accordance with an embodiment of the present invention. A buffer 201 within a Synchronous Dynamic Random Access Memory (SDRAM) 202 receives a transport stream. The buffer 201 can receive the transport stream, either from a storage device 204, such as, for example, a hard disc or a DVD, or a communication channel 206.

A data transport processor 205 demultiplexes the transport stream into audio transport streams and video transport streams. The data transport processor 205 provides the audio transport stream to an audio portion and the video transport stream to a video transport processor 207.

The audio portion includes a compressed data buffer 230 and an audio decoder 235. The compressed data buffer 230 stores frames of audio data 10A( ). The audio decoder 235 decodes the frames of audio data 10A( ) for play on a speaker.

The video transport processor 207 parses the video transport stream and recovers the video elementary stream. The video transport processor 207 writes the video elementary stream to a compressed data buffer 208. A video decoder 209 reads the video elementary stream from the compressed data buffer 208 and decodes the video. The video decoder 209 decodes the video on a picture by picture basis. When the video decoder 209 decodes a picture, the video decoder 209 writes the picture to a frame buffer 210.

The video decoder 209 receives the pictures in decoding order. However, as noted above, the decoding and displaying orders can be different. Accordingly, the decoded pictures are stored in frame buffers 210 to be available at display time. At display time, display engine 211 scales the video picture, renders the graphics, and constructs the complete display. Once the display is ready to be presented, it is passed to a video encoder 216 where it is converted to analog video using an internal digital to analog converter (DAC). The digital audio is converted to analog in an audio digital to analog converter (DAC) 217.

The frame buffers 210 also allow the video decoder 209 to predict predicted pictures from reference pictures. The decoder 209 decodes at least one picture, $I_0$, $B_1$, $B_2$, $P_3$, $B_4$, $B_5$, $P_6$, $B_7$, $B_8$, $P_9$, during each frame display period, in the absence of Personal Video Recording (PVR) modes when live decoding is turned on. Due to the presence of the B-pictures, $B_1$, $B_2$, the decoder 209 decodes the pictures, $I_0$, $B_1$, $B_2$, $P_3$, $B_4$, $B_5$, $P_6$, $B_7$, $B_8$, $P_9$ in an order that is different from the display order. The decoder 209 decodes each of the reference pictures, e.g., $I_0$, $P_3$, prior to each picture that is predicted from the reference picture. For example, the decoder 209 decodes $I_0$, $B_1$, $B_2$, $P_3$, in the order, $I_0$, $P_3$, $B_1$, and $B_2$. After decoding $I_0$ and $P_3$, the decoder 209 applies the offsets and displacements stored in $B_1$ and $B_2$, to the decoded $I_0$ and $P_3$, to decode $B_1$ and $B_2$. The frame buffers 210 store the decoded pictures, $I_0$ and $P_3$, in order for the video decoder 209 to decode $B_1$ and $B_2$.

The video decoder 209 also writes a number of parameters associated with each picture in a buffer descriptor structure 212. Each frame buffer 210 is associated with a buffer descriptor structure 212. The buffer descriptor structure 212 associated with a frame buffer 210 stores parameters associated with the picture stored in the frame buffer 210. The parameters can include, for example presentation time stamps.

A display manager 213 examines the buffer descriptor structures, and on the basis of the information therein, determines the display order for the pictures. The display manager 213 maintains a display queue 214. The display queue 214 includes identifiers identifying the frame buffers 210 storing the pictures to be displayed. The display engine 211 examines the display queue 214 to determine the next picture to be displayed.

The display manager 213 can determine the next picture to be displayed by examining the PTS parameters associated with the pictures. The display manager 213 can compare the PTS values associated with pictures to a system clock reference (SCR) to determine the ordering of the pictures for display.

Alternatively, the display manager 213 can also determine the order of the pictures to be displayed by examining the type of pictures decoded. In general, when the video decoder 209 decodes a B-picture, the B-picture is the next picture to be displayed. When the video decoder 209 decodes an I-picture or P-picture, the display manager 213 selects the I-picture or P-picture that was most recently stored in the frame buffer 210 to be displayed next.

A particular one of the frame buffers 210 stores B-pictures, while two other frame buffers 210 store I-pictures and P-pictures. When the video decoder 209 decodes a B-picture, the video decoder 209 writes the B-picture to the particular frame buffer 210 for storing B-pictures, thereby overwriting the previously stored B-picture. When the video decoder 209 decodes an I-picture or a P-picture, the video decoder 209 writes the I-picture or P-picture to the frame buffer 210 storing the I-picture or P-picture that has been stored for the longest period of time, thereby overwriting the I-picture or P-picture.

The circuit also includes a controller 220 that acts as the master for the data transport processor 205, the video transport processor 207, the video decoder 209, the display engine 211, and the display manager 213.

As noted above, the frames 10A( ) of audio data and pictures of video data 10V( ) are associated with a time stamp TS, PTS, DTS. The video decoder 209 decodes one of the pictures 10V( ) of the video data while the audio decoder 235 decodes one of the frames of the audio data 10A( ). The difference between the decode time stamp DTS associated with the picture 10V( ) of the video data decoded by the video decoder 209, and the time stamp TS associated with the frames 10A( ) of the audio data decoded by the audio decoder 235 is within a certain margin of error from a predetermined offset.

According to certain aspects of the present invention, the predetermined offset can be based on the difference in times taken by the video decoder 209 to decode a picture of the video data 10V( ) and taken by the audio decoder 235 to decode a frame of the audio data 10A( ).

Generally, the video decoder 209 can take a longer time to decode a picture 10V( ) of video data. Thus, if decoding the picture 10V( ) of the video data leads (i.e., are decoded earlier) the decoding of the frames 10A( ) of the audio data (i.e., are decoded later) having approximately equal DTSs by an offset (the difference between decoding times of audio and video decoders), pictures of the video 10V( ) and frames of the audio data 10A( ) to be played at the same time become available for play at the same time. The foregoing can be achieved by decoding a picture 10V( ) and an audio portion 10A( ) where the audio portion 10A( ) is associated with a time stamp that exceeds the time stamp associated with the video portion 10V( ) by the offset.

According to certain aspects of the invention, the decoder system can also include a system clock 240 for providing a time reference. The controller 220 compares the time stamps DTS or PTS associated with pictures 10V( ) of the video data and the time stamps TS associated with frames 10A( ) of the audio data to the time reference. The controller 220 then selects the audio data 10A( ) associated with the time stamp DTS or PTS that exceeds the time reference by within a margin of error from the offset. The controller 220 selects the frame 10V( ) of the video data associated with the time stamp within the margin of error from the time reference.

The decoder system(s) as described herein may be implemented as a board level product, as a single chip, application specific integrated circuit (ASIC), or with varying levels of the system integrated on a single chip with other portions of the system as separate components. The degree of integration of the monitoring system may primarily be determined by speed of incoming MPEG packets, and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor can be implemented as part of an ASIC device wherein the memory storing instructions is implemented as firmware. In one representative embodiment, the decoder system can be implemented as a single integrated circuit (i.e., a single chip design).

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A method for displaying audio data and video data, the method comprising:
   comparing time stamps associated with portions of video data with a predetermined offset to a clock reference;
   comparing time stamps associated with portions of audio data to the clock reference;
   examining a time stamp of a portion of the audio data, the portion of the audio data selected for decoding based on the comparison between the time stamps associated with the audio data and the clock reference;
   comparing the time stamp of the portion of the audio data with a time stamp of a portion of the video data, the portion of the video data selected for decoding based on the comparison between the time stamps associated with the video data and the clock reference;
   determining that a difference between the time stamp associated with the portion of the video data and the time stamp associated with the portion of the audio data is within a certain margin of error from the predetermined offset; and
   decoding the portion of the audio data while decoding the portion of the video data, responsive to the determination that the difference is within the certain margin of error from the predetermined offset.

2. The method of claim 1, wherein the predetermined offset is a function of a difference between a time for decoding video data and a time for decoding audio data.

3. The method of claim 1, wherein the time stamp for the portion of the video data and the time stamp for the portion of the audio data are offset such that decoding of the portion of the video data ends concurrently with decoding of the portion of the audio data.

4. The method of claim 1, wherein the time stamp associated with the portion of the video data comprises a decode time stamp.

5. The method of claim 1, wherein the time stamp associated with the portion of the audio data exceeds the time stamp associated with the portion of the video data.

6. The method of claim 1, further comprising storing the audio and video data.

7. A system for displaying audio data and video data, the system comprising:
one or more controllers operable to compare time stamps associated with portions of video data with a predetermined offset to a clock reference, compare time stamps associated with portions of the audio data to the clock reference, examine examining a time stamp of a portion of the audio data selected for decoding based on the comparison between the time stamps associated with the audio data and the clock reference, and
compare the time stamp of the portion of the audio data with a time stamp of a portion of the video data, the portion of the video data selected for decoding based on the comparison between the time stamps associated with the video data and the clock reference,
the one or more controllers further operable to determine that a difference between the time stamp associated with the portion of the video data and the time stamp associated with the portion of the audio data is within a certain margin of error from the predetermined offset;
an audio decoder operable to decode the portion of the audio data, responsive to the determination that the difference is within the certain margin of error from the predetermined offset; and
a video decoder operable to decode the portion of the video data while the audio decoder decodes the portion of the audio data, responsive to the determination that the difference is within the certain margin of error from the predetermined offset.

8. The system of claim 7, wherein the predetermined offset is a function of a difference between a time for decoding video data and a time for decoding audio data.

9. The system of claim 7, wherein the time stamp for the portion of the video data and the time stamp for the portion of the audio data are offset such that decoding of the portion of the video data ends concurrently with decoding of the portion of the audio data.

10. The system of claim 7, wherein the time stamp associated with the portion of the video data comprises a decode time stamp.

11. The system of claim 7, wherein the time stamp associated with the portion of the audio data exceeds the time stamp associated with the portion of the video data.

12. The system of claim 7, further comprising:
a system clock operable to provide a time reference,
wherein the one or more controllers compare time stamps associated with portions of the video data with the predetermined offset to the time reference and compare time stamps associated with portions of the audio data to the time reference.

13. The system of claim 7, further comprising a memory for storing the audio data and video data.

14. A non-transitory computer-readable medium having executable instructions for displaying audio data and video data, the instructions operable to cause a processor to:
comparing time stamps associated with portions of video data with a predetermined offset to a clock reference;
comparing time stamps associated with portions of audio data to the clock reference;
examine a time stamp of a portion of the audio data, the portion of the audio data selected for decoding based on the comparison between the time stamps associated with the audio data and the clock reference;
compare the time stamp of the portion of the audio data with a time stamp of a portion of the video data, the portion of the video data selected for decoding based on the comparison between the time stamps associated with the video data and the clock reference;
determine that a difference between the time stamp associated with the portion of the video data and the time stamp associated with the portion of the audio data is within a certain margin of error from a predetermined offset; and
decode the portion of the audio data while decoding the portion of the video data, responsive to the determination that the difference is within the certain margin of error from the predetermined offset.

15. The non-transitory computer-readable medium of claim 14, wherein the instructions further comprise instructions operable to cause the processor to compare time stamps associated with portions of the video data with the predetermined offset to a time reference provided by a system clock.

16. The non-transitory computer-readable medium of claim 14, wherein the instructions further comprise instructions operable to cause the processor to compare time stamps associated with portions of the audio data to a time reference provided by a system clock.

* * * * *